(12) United States Patent
Nakatsuka et al.

(10) Patent No.: US 12,435,792 B2
(45) Date of Patent: Oct. 7, 2025

(54) MECHANICAL SEAL DEVICE

(71) Applicant: PILLAR CORPORATION, Osaka (JP)

(72) Inventors: Masaya Nakatsuka, Osaka (JP); Masashi Hayashi, Osaka (JP); Shigeyuki Fujinaga, Osaka (JP)

(73) Assignee: PILLAR CORPORATION, Osaka (JP)

( * ) Notice: Subject to any disclaimer, the term of this patent is extended or adjusted under 35 U.S.C. 154(b) by 0 days.

(21) Appl. No.: 18/860,873

(22) PCT Filed: Jan. 10, 2023

(86) PCT No.: PCT/JP2023/000283
§ 371 (c)(1),
(2) Date: Oct. 28, 2024

(87) PCT Pub. No.: WO2023/243126
PCT Pub. Date: Dec. 21, 2023

(65) Prior Publication Data
US 2025/0290566 A1    Sep. 18, 2025

(30) Foreign Application Priority Data

Jun. 16, 2022 (JP) ................................ 2022-096969

(51) Int. Cl.
*F16J 15/34* (2006.01)
(52) U.S. Cl.
CPC ....... *F16J 15/3404* (2013.01); *F16J 15/3484* (2013.01)
(58) Field of Classification Search
CPC ...... F16J 15/3404; F16J 15/3484; F04C 2/344
See application file for complete search history.

(56) References Cited

U.S. PATENT DOCUMENTS

| 2,628,852 A | * | 2/1953 | Voytech | ................... | F16J 15/38 |
| | | | | | 165/47 |
| 3,495,840 A | * | 2/1970 | Wilk | ...................... | F16J 15/342 |
| | | | | | 277/408 |

(Continued)

FOREIGN PATENT DOCUMENTS

| JP | S41018986 B | 11/1966 |
| JP | 2005351117 A | 12/2005 |

(Continued)

OTHER PUBLICATIONS

International Search Report issued in corresponding International Application No. PCT/JP2023/000283, mailed Feb. 21, 2023, with translation (5 pages).

(Continued)

*Primary Examiner* — Nicholas L Foster
(74) *Attorney, Agent, or Firm* — Osha Bergman Watanabe & Burton LLP

(57) ABSTRACT

A mechanical seal device includes: a seal case surrounding a rotary shaft of a rotary machine and separating a machine inner area and a machine outer area of the rotary machine; a mechanical seal placed between the seal case and the rotary shaft; a sealing liquid chamber which is formed in the seal case and into which a sealing liquid for lubricating a sliding portion of the mechanical seal is introduced; and a circulation pump mechanism configured to circulate the sealing liquid in the sealing liquid chamber. The circulation pump mechanism includes: an annular rotor having a mounting groove open at an outer circumferential surface thereof; a vane provided in the mounting groove; a spring provided on a deep side with respect to the vane in the mounting groove; and a retaining member provided on the deep side with respect to the vane in the mounting groove.

6 Claims, 11 Drawing Sheets

(56) References Cited

U.S. PATENT DOCUMENTS

| | | | | |
|---|---|---|---|---|
| 3,746,350 | A * | 7/1973 | Mayer | F16J 15/3404 |
| | | | | 277/408 |
| 3,888,495 | A * | 6/1975 | Mayer | F04D 29/043 |
| | | | | 277/927 |
| 4,545,588 | A * | 10/1985 | Nagai | F16J 15/346 |
| | | | | 277/408 |
| 4,721,311 | A * | 1/1988 | Kakabaker | F16J 15/162 |
| | | | | 277/408 |
| 5,195,867 | A * | 3/1993 | Stirling | F16J 15/3404 |
| | | | | 415/111 |
| 9,347,565 | B2 * | 5/2016 | Berger | F16J 15/3404 |
| 11,441,571 | B2 * | 9/2022 | Yoshikawa | F04D 29/128 |
| 11,698,080 | B2 * | 7/2023 | Yoshikawa | F04D 29/124 |
| | | | | 415/111 |
| 2025/0189040 | A1 * | 6/2025 | Nakatsuka | F04C 2/344 |

FOREIGN PATENT DOCUMENTS

| | | | |
|---|---|---|---|
| JP | 2014077402 A | 5/2014 | |
| JP | 2022018073 A | 1/2022 | |

OTHER PUBLICATIONS

Written Opinion issued in corresponding International Application No. PCT/JP2023/000283, mailed Feb. 21, 2023 (4 pages).

\* cited by examiner

MECHANICAL SEAL DEVICE

TECHNICAL FIELD

The present invention relates to a mechanical seal device.

BACKGROUND ART

A mechanical seal device installed in a rotary machine includes a circulation pump mechanism that circulates a sealing liquid in order to enhance lubrication between sealing surfaces of a rotary sealing ring and a fixed sealing ring and to remove sliding heat generated between the sealing surfaces (see, for example, PATENT LITERATURE 1). A mechanical seal device of PATENT LITERATURE 1 includes a circulation pump mechanism that functions as a vane pump. The circulation pump mechanism includes a rotor that rotates integrally with a rotary shaft of a rotary machine, a plurality of vanes that freely project and retract from the outer circumferential surface of the rotor, cylindrical springs that respectively bias the vanes in a direction in which the vanes are caused to project, and a plurality of pump chambers that are each demarcated between the adjacent vanes. The circulation pump mechanism can circulate a fixed volume of a sealing liquid each time the rotor makes one rotation, and thus can circulate the required flow volume of the sealing liquid even in a rotary machine that rotates at low speeds, such as an agitator.

CITATION LIST

Patent Literature

PATENT LITERATURE 1: Japanese Laid-Open Patent Publication No. 2022 18073

SUMMARY OF THE INVENTION

Technical Problem

In the circulation pump mechanism of PATENT LITERATURE 1, mounting grooves into which the vanes are inserted are formed on the rotor, and the springs are placed on the deep side with respect to the vanes in the mounting grooves. Each spring is merely placed in the mounting groove in a state where both ends in the longitudinal direction thereof are in contact with the bottom surface of the mounting groove and the back surface of the vane, respectively. Therefore, if an intermediate portion in the longitudinal direction of the spring buckles, the intermediate portion is likely to come into contact with the side surface of the mounting groove. Therefore, if the circulation pump mechanism is used for a long period of time, the wear of the spring may proceed due to contact between the intermediate portion of the spring and the side surface of the mounting groove, and the spring may be broken.

The present disclosure has been made in view of such circumstances, and an object of the present disclosure is to provide a mechanical seal device that can inhibit a spring of a circulation pump mechanism from coming into contact with a rotor and wearing.

Solution to Problem (1) The present disclosure is directed to a mechanical seal device including: a seal case surrounding a rotary shaft of a rotary machine and separating a machine inner area and a machine outer area of the rotary machine from each other; at least one mechanical seal placed between the seal case and the rotary shaft; a sealing liquid chamber which is formed in the seal case and into which a sealing liquid for lubricating a sliding portion of the mechanical seal is introduced; and a circulation pump mechanism configured to circulate the sealing liquid in the sealing liquid chamber, wherein the circulation pump mechanism includes an annular rotor provided on the rotary shaft side so as to be integrally rotatable with the rotary shaft and having a mounting groove open at an outer circumferential surface thereof, a vane provided in the mounting groove and configured to freely project and retract with respect to the outer circumferential surface of the rotor, a spring provided on a deep side with respect to the vane in the mounting groove and configured to bias the vane in a direction in which the vane is caused to project from the outer circumferential surface of the rotor, and a retaining member provided on the deep side with respect to the vane in the mounting groove and having an insertion hole into which the spring is inserted.

In the mechanical seal device of the present disclosure, the spring is inserted into the insertion hole of the retaining member provided on the deep side with respect to the vane in the mounting groove of the rotor of the circulation pump mechanism. Therefore, an intermediate portion in the longitudinal direction of the spring is held by the retaining member. Accordingly, the intermediate portion of the spring can be inhibited from buckling and coming into contact with the side surface of the mounting groove. As a result, the spring can be inhibited from coming into contact with the rotor and wearing.

(2) In the mechanical seal device of (1) above, preferably, the spring is a conical coil spring, and a small diameter end side of the conical coil spring is exposed to the vane side from the retaining member.

In this case, the portion, of the conical coil spring, exposed from the retaining member has a smaller diameter than the other portion of the conical coil spring. Therefore, the exposed portion of the conical coil spring can be further inhibited from coming into contact with the side surface of the mounting groove. As a result, the spring (conical coil spring) can be further inhibited from coming into contact with the rotor and wearing.

(3) In the mechanical seal device of (1) or (2) above, preferably, the circulation pump mechanism includes a plurality of the springs provided in the mounting groove, and a plurality of the insertion holes into which the plurality of the springs are individually inserted are formed in the retaining member.

In this case, since the plurality of springs are individually inserted into the plurality of insertion holes of the retaining member, the springs can be inhibited from coming into contact with each other and wearing.

(4) In the mechanical seal device of any one of (1) to (3) above, preferably, the spring has an exposed portion exposed to the vane side from the retaining member, and a recess into which the exposed portion is inserted is formed on the vane.

In this case, since the exposed portion, of the spring, exposed from the retaining member is inserted into the recess of the vane, the exposed portion of the spring can be further inhibited from coming into contact with the side surface of the mounting groove. As a result, the spring can be further inhibited from coming into contact with the rotor and wearing.

(5) In the mechanical seal device of (4) above, preferably, the circulation pump mechanism includes a plurality of the springs placed in the mounting groove, and a plurality of the recesses into which the exposed portions of the plurality of the springs are individually inserted are formed on the vane.

In this case, since the exposed portions of the plurality of the springs are individually inserted into the plurality of the recesses of the vane, the exposed portions of the springs can be inhibited from coming into contact with each other and wearing.

(6) According to another aspect, the present disclosure is directed to a mechanical seal device including: a seal case surrounding a rotary shaft of a rotary machine and separating a machine inner area and a machine outer area of the rotary machine from each other; at least one mechanical seal placed between the seal case and the rotary shaft; a sealing liquid chamber which is formed in the seal case and into which a sealing liquid for lubricating a sliding portion of the mechanical seal is introduced; and a circulation pump mechanism configured to circulate the sealing liquid in the sealing liquid chamber, wherein the circulation pump mechanism includes an annular rotor provided on the rotary shaft side so as to be integrally rotatable with the rotary shaft and having a mounting groove open at an outer circumferential surface thereof, a vane provided in the mounting groove and configured to freely project and retract with respect to the outer circumferential surface of the rotor, and a spring provided on a deep side with respect to the vane in the mounting groove and configured to bias the vane in a direction in which the vane is caused to project from the outer circumferential surface of the rotor, and the spring is a conical coil spring.

In the mechanical seal device of the present disclosure, a conical coil spring is provided, as the spring which biases the vane, on the deep side with respect to the vane in the mounting groove of the rotor of the circulation pump mechanism. Accordingly, by setting the outer diameter at the large diameter end of the conical coil spring to be equal to or smaller than the outer diameter of a cylindrical spring in the conventional art, an intermediate portion in the longitudinal direction of the conical coil spring can be inhibited from coming into contact with the side surface of the mounting groove. As a result, the spring (conical coil spring) can be inhibited from coming into contact with the rotor and wearing.

Advantageous Effects of the Invention

The mechanical seal device of the present disclosure can inhibit the spring of the circulation pump mechanism from coming into contact with the rotor and wearing.

DETAILED DESCRIPTION

Next, preferred embodiments of the present disclosure will be described with reference to the accompanying drawings. At least parts of the embodiments described below may be combined as desired.

First Embodiment

[Mechanical Seal Device]

Figure 1:
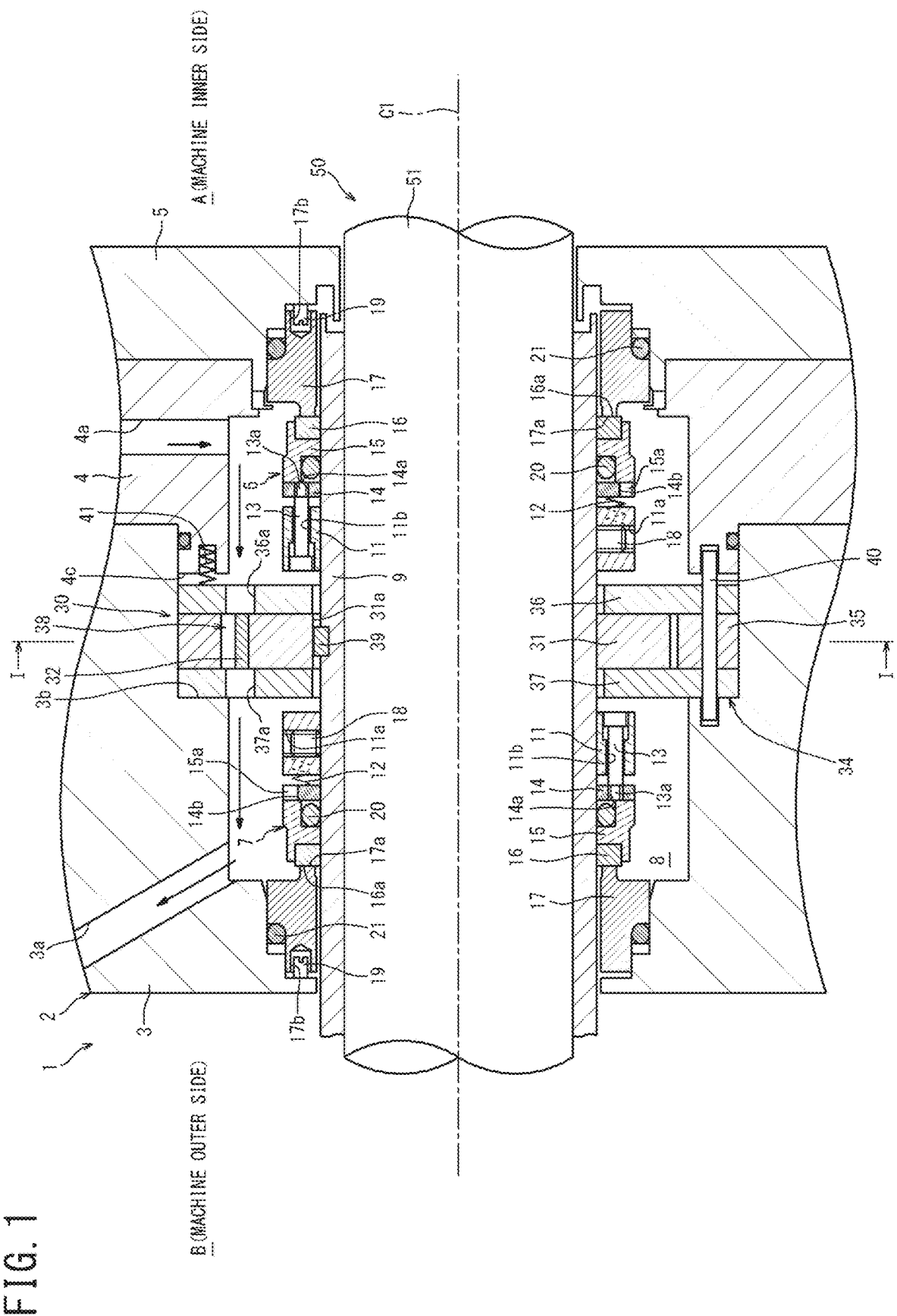
FIG. 1 is a cross-sectional view showing a mechanical seal device according to a first embodiment of the present disclosure.

FIG. 1 is a cross-sectional view showing a mechanical seal device 1 according to a first embodiment of the present disclosure. The mechanical seal device 1 is provided in a rotary machine 50 such as a pump and an agitator that handles a sealed fluid. The mechanical seal device 1 includes a seal case 2, a first mechanical seal 6, a second mechanical seal 7, a sealing liquid chamber 8, and a circulation pump mechanism 30.

The seal case 2 is fixed to a casing (not shown) of the rotary machine 50, and separate a machine inner area A and a machine outer area B of the rotary machine 50 from each other. The seal case 2 of the present embodiment has a first case body 3, a second case body 4, and a third case body 5 in order from the machine outer area B side toward the machine inner area A side. The first case body 3, the second case body 4, and the third case body 5 are each formed in an annular shape and surround a rotary shaft 51 of the rotary machine 50. Hereinafter, in the present specification, the machine inner area A side is referred to as machine inner side, and the machine outer area B side is referred to as machine outer side.

The first mechanical seal 6 and the second mechanical seal 7 constitute a double-type mechanical seal and are placed between the seal case 2 and the rotary shaft 51 so as to be spaced at a predetermined interval in the axial direction of the rotary shaft 51 (hereinafter referred to simply as "axial direction"). The first mechanical seal 6 is placed on the machine inner side and seals between the machine inner area A and the sealing liquid chamber 8 (described later). The second mechanical seal 7 is placed on the machine outer side and seals between the machine outer area B and the sealing liquid chamber 8.

The first mechanical seal 6 includes a spring retainer 11, springs 12, drive pins 13, a drive collar 14, a retainer 15, a rotary sealing ring 16, a stationary sealing ring 17, set screws 18, pins 19, an O-ring 20, and an O-ring 21.

The spring retainer 11 is formed in an annular shape and is fixed via a sleeve 9 on the outer circumferential side of the rotary shaft 51. A plurality of screw holes 11a (only one is shown in FIG. 1) penetrating in the radial direction are formed in the spring retainer 11 so as to be spaced at predetermined intervals in the circumferential direction. The set screw 18 is screwed into each screw hole 11a, and the tip of the set screw 18 presses the outer circumferential surface of the sleeve 9. Accordingly, the spring retainer 11 is fixed to the rotary shaft 51 side by the set screws 18.

A plurality of through holes 11b (only one is shown in FIG. 1) penetrating in the axial direction are formed in the spring retainer 11 so as to be spaced at predetermined intervals in the circumferential direction. The drive pin 13 is inserted into each through hole 11b and is held so as to be movable within a predetermined range in the axial direction relative to the spring retainer 11.

An end portion on the machine inner side of each drive pin 13 is fixed to the annular drive collar 14 which is mounted on the outer circumferential surface of the sleeve 9 on the machine inner side with respect to the spring retainer 11 so as to be movable in the axial direction. Specifically, a plurality of screw holes 14a (only one is shown in FIG. 1) penetrating in the axial direction are formed in the drive collar 14 so as to be spaced at predetermined intervals in the circumferential direction. An externally threaded portion 13a formed on the end portion on the machine inner side of each drive pin 13 is screwed into each screw hole 14a. Accordingly, the drive collar 14 is restricted from rotating relative to the spring retainer 11 while being held via the drive pin 13 so as to be movable in the axial direction relative to the spring retainer 11.

The spring retainer 11 holds end portions of a plurality of the springs 12 (only one is shown in FIG. 1) at predetermined intervals in the circumferential direction. Other end portions of the springs 12 are in contact with the end surface on the machine outer side of the drive collar 14. Accordingly, the drive collar 14 is biased toward the machine inner side by the biasing forces of the springs 12.

The annular retainer 15 is placed adjacent to the drive collar 14 on the machine inner side with respect to the drive collar 14. The retainer 15 is mounted on the outer circumferential surface of the sleeve 9 so as to be movable in the axial direction. A plurality of engagement pins 15a (only one is shown in FIG. 1) projecting toward the machine outer side are provided on the end surface on the machine outer side of the retainer 15 so as to be spaced at predetermined intervals in the circumferential direction.

Each engagement pin 15a is engaged with an engagement hole 14b formed in the drive collar 14. Accordingly, the retainer 15 is restricted from rotating relative to the drive collar 14 while being held together with the drive collar 14 so as to be movable in the axial direction relative to the rotary shaft 51. The O-ring 20 made of rubber is provided on the inner circumference of the retainer 15 so as to seal (secondarily seal) between the outer circumferential surface of the sleeve 9 and the inner circumference of the retainer 15.

The annular rotary sealing ring 16 is fitted and fixed on the machine inner side of the retainer 15. The end surface on the machine inner side of the rotary sealing ring 16 is a sealing surface 16a. The stationary sealing ring 17 is placed adjacent to the rotary sealing ring 16 on the machine inner side with respect to the rotary sealing ring 16. The stationary sealing ring 17 is fitted and fixed to the inner circumferential side of the third case body 5. The end surface on the machine outer side of the stationary sealing ring 17 is a sealing surface 17a on which the sealing surface 16a of the rotary sealing ring 16 slides.

A plurality of pin grooves 17b (only one is shown in FIG. 1) are formed on the machine inner side of the stationary sealing ring 17 so as to be spaced at predetermined intervals in the circumferential direction. The pin 19 which is fixed on the inner circumferential side of the third case body 5 so as to project toward the machine outer side is inserted into each pin groove 17b. Accordingly, the stationary sealing ring 17 is restricted from rotating relative to the third case body 5.

The O-ring 21 made of rubber is provided on the outer circumference of the stationary sealing ring 17 so as to seal (secondarily seal) between the inner circumferential surface of the third case body 5 and the outer circumference of the stationary sealing ring 17.

Similar to the first mechanical seal 6, the second mechanical seal 7 includes a spring retainer 11, springs 12, drive pins 13, a drive collar 14, a retainer 15, a rotary sealing ring 16, a stationary sealing ring 17, set screws 18, pins 19, an O-ring 20, and an O-ring 21. The spring retainer 11 to the O-ring 21 that are the components of the second mechanical seal 7 are arranged so as to be symmetrical with the spring retainer 11 to the O-ring 21 that are the components of the first mechanical seal 6 in the axial direction with the circulation pump mechanism 30 interposed therebetween.

Each pin 19 of the second mechanical seal 7 is fixed on the inner circumferential side of the first case body 3 so as to project toward the machine inner side. The O-ring 21 of the second mechanical seal 7 seals (secondarily seals) between the stationary sealing ring 17 and the first case body 3. The other configuration of the second mechanical seal 7 is the same as that of the first mechanical seal 6, and thus the description thereof is omitted.

The sealing liquid chamber 8 is an annular space formed in the seal case 2. A sealing liquid for lubricating and cooling sliding portions between the sealing surfaces 16a and 17a of the first mechanical seal 6 and sliding portions between the sealing surfaces 16a and 17a of the second mechanical seal 7 is introduced into the sealing liquid chamber 8. Water, an oil, a solvent, or the like, which cause no problem even when being mixed in the sealed fluid, are used as the sealing liquid, depending on the sealed fluid.

In the second case body 4, a supply path 4a for supplying the sealing liquid from the outside to the sealing liquid chamber 8 is formed. In the first case body 3, a discharge path 3a for discharging the sealing liquid from the sealing liquid chamber 8 to the outside is formed. Accordingly, the sealing liquid supplied from the supply path 4a to the sealing liquid chamber 8 during operation of the rotary machine 50 lubricates and cools each sliding portion of the first and second mechanical seals 6 and 7 and is discharged through the discharge path 3a to the outside.

[Circulation Pump Mechanism]

Figure 2:
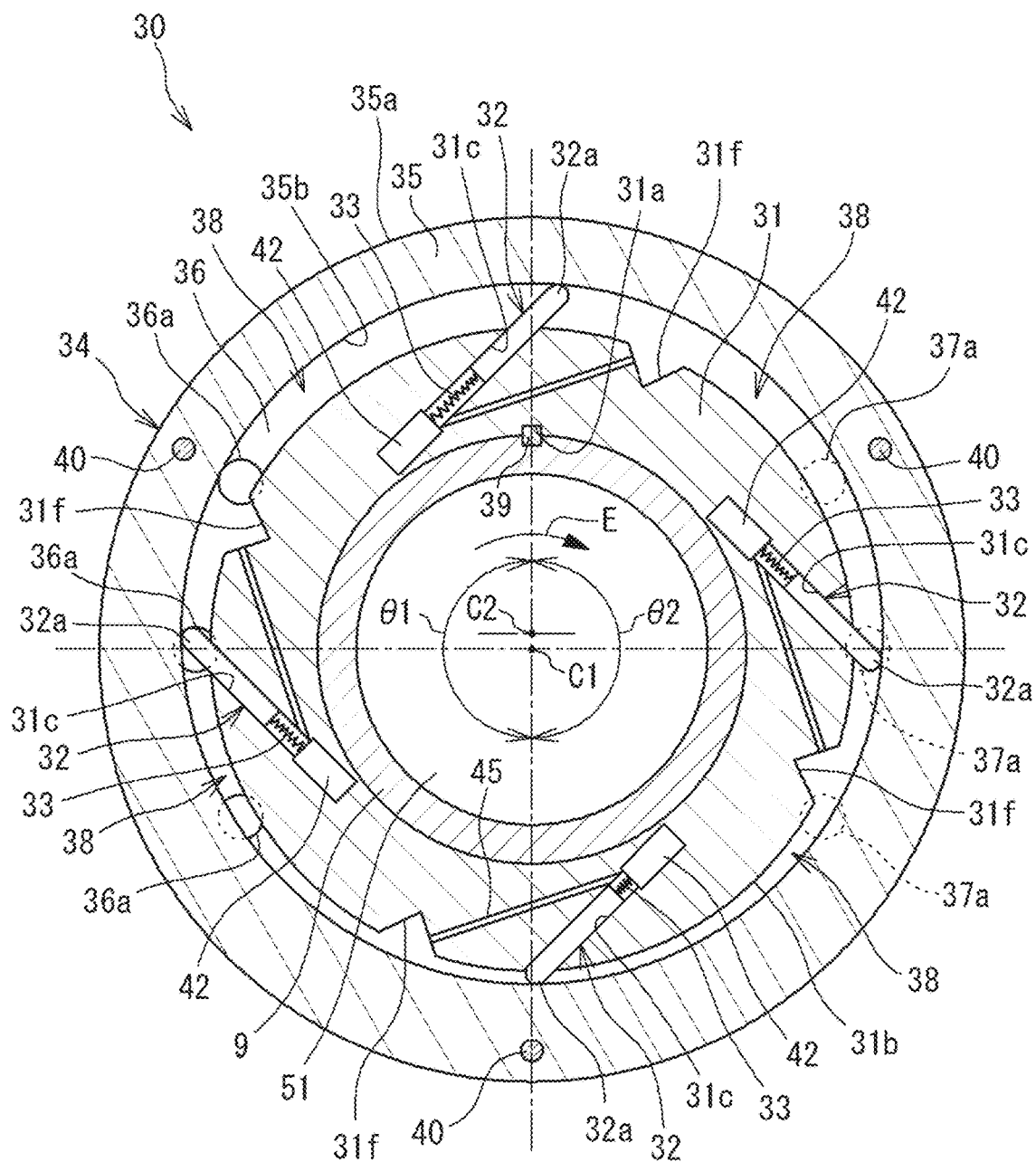
FIG. 2 is a cross-sectional view as seen in the direction of arrows I-I in FIG. 1.

FIG. 2 is a cross-sectional view as seen in the direction of arrows I-I in FIG. 1. In FIG. 1 and FIG. 2, the circulation pump mechanism 30 circulates the sealing liquid in the sealing liquid chamber 8 and is placed between the first mechanical seal 6 and the second mechanical seal 7 in the seal case 2. The circulation pump mechanism 30 includes a rotor 31, a plurality of vanes 32, a plurality of springs (biasing members) 33, a housing 34, a plurality of pump chambers 38, and retaining members 42. In FIG. 2, cross-sections of the rotary shaft 51, the vanes 32, and the retaining members 42 are omitted.

The rotor 31 is composed of, for example, an annular member made of a metal such as stainless steel. The rotor 31 is fixed to the outer circumferential side of the sleeve 9. Specifically, a key 39 fixed to the outer circumference of the sleeve 9 is engaged with a key groove 31a formed on the inner circumferential side of the rotor 31, thereby fixing the rotor 31 to the outer circumferential side of the sleeve 9. Accordingly, the rotor 31 is mounted on the rotary shaft 51 side so as to be integrally rotatable with the rotary shaft 51, and the rotary torque of the rotary shaft 51 is transmitted to the rotor 31 via the sleeve 9.

[Mounting Grooves]

Figure 3:
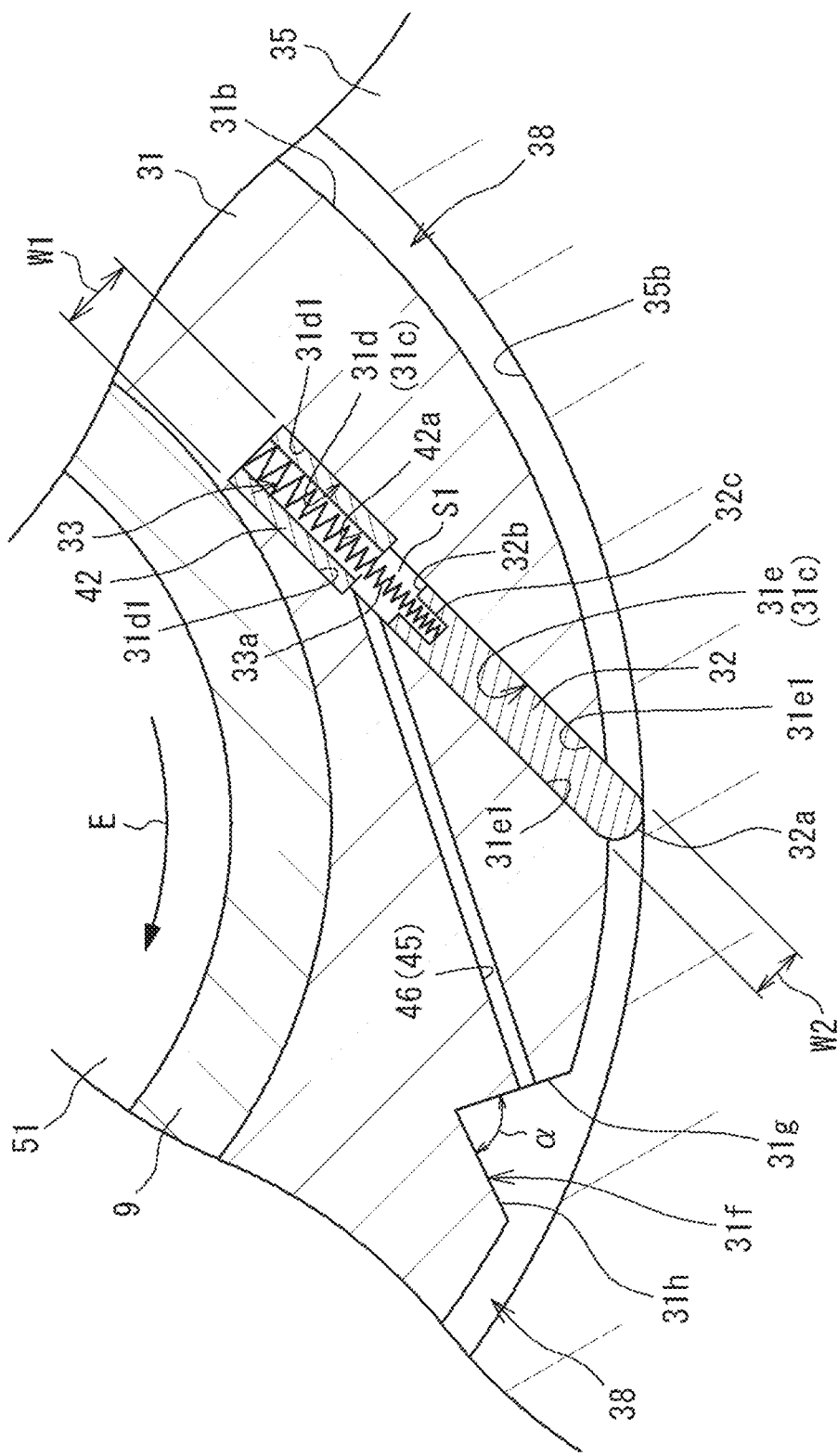
FIG. 3 is an enlarged cross-sectional view showing an area around 6 o'clock in FIG. 2 in a circulation pump mechanism.

FIG. 3 is an enlarged cross-sectional view showing an area around 6 o'clock in FIG. 2 in the circulation pump mechanism 30. In FIG. 2 and FIG. 3, a plurality of mounting grooves 31c (four in FIG. 2) are formed on the rotor 31 so as to be open at an outer circumferential surface 31b thereof and spaced at predetermined intervals in the circumferential direction. Each mounting groove 31c is formed over the entirety in the axial direction of the rotor 31 (direction perpendicular to the drawing sheet of FIG. 3).

Each mounting groove 31c has a first groove portion 31d and a second groove portion 31e. The first groove portion 31d is formed on the bottom side (deep side) of the mounting groove 31c. The second groove portion 31e is formed on the opening side of the mounting groove 31c. A groove width W1 of the first groove portion 31d is larger than a groove width W2 of the second groove portion 31e. The depth of the first groove portion 31d is shallower than the depth of the second groove portion 31e.

[Retaining Members]

Figure 4:
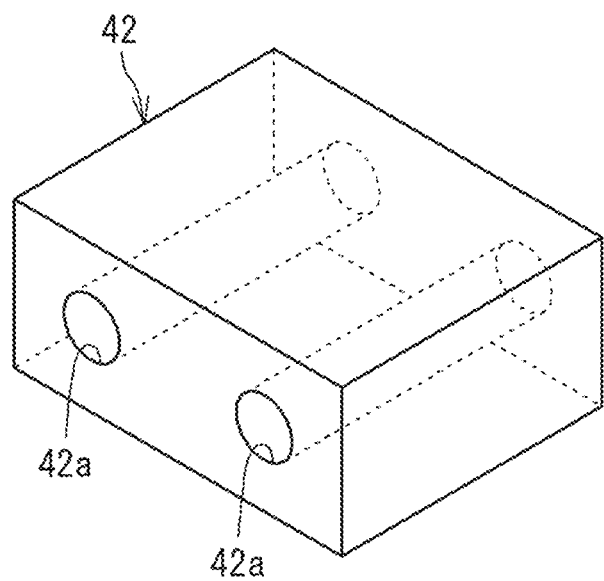
FIG. 4 is a perspective view showing a retaining member.

The retaining member 42 is fitted into the first groove portion 31d of each mounting groove 31c from the axially outer side thereof. FIG. 4 is a perspective view showing the retaining member 42. In FIG. 3 and FIG. 4, each retaining member 42 is composed of a rectangular parallelepiped-shaped member made of a synthetic resin. The retaining member 42 of the present embodiment is made of, for example, a fluorine resin such as polytetrafluoroethylene (PTFE). The retaining member 42 is fitted to a pair of side surfaces 31d1 of the first groove portion 31d with a tightening allowance. Accordingly, the retaining member 42 is fixed to the first groove portion 31d.

The retaining member 42 has an insertion hole 42a into which the spring 33 is inserted. A plurality of insertion holes 42a (two in FIG. 4) are formed in the retaining member 42 so as to be aligned in the axial direction of the rotor 31. Each insertion hole 42a is formed so as to penetrate the retaining member 42 in the depth direction of the first groove portion 31d. Each insertion hole 42a communicates with the second groove portion 31e.

[Springs]

A plurality of springs 33 are provided in each mounting groove 31c. Specifically, a plurality of springs 33 (two in this case) are individually inserted into the plurality of insertion holes 42a of the retaining member 42 fixed to each first groove portion 31d. Each spring 33 is, for example, a conical coil spring made of a metal such as stainless steel. The conical coil spring 33 is inserted into the mounting groove 31c such that the large diameter end thereof is located on the deep side. The large diameter end of the conical coil spring 33 penetrates the insertion hole 42a and is in contact with the bottom surface of the first groove portion 31d.

The length in the longitudinal direction of the conical coil spring 33 in a most contracted state (state shown in FIG. 3) thereof is longer than the depth of the first groove portion 31d. Therefore, the conical coil spring 33 has an exposed portion 33a which is always exposed from the insertion hole 42a of the retaining member 42 into the second groove portion 31e. In the present embodiment, the small diameter end side of the conical coil spring 33 is the exposed portion 33a.

[Vanes]

In FIG. 2 and FIG. 3, the vane 32 is inserted into the second groove portion 31e of each mounting groove 31c. Each vane 32 is composed of, for example, a flat plate-shaped member made of carbon. The length in the axial direction (direction perpendicular to the drawing sheet of FIG. 3) of the vane 32 is substantially the same as the length in the axial direction of the mounting groove 31c. The vane 32 is slidable relative to a pair of side surfaces 31e1 of the second groove portion 31e. Accordingly, the vane 32 freely projects and retracts with respect to the outer circumferential surface 31b of the rotor 31 in the second groove portion 31e.

Figure 5:
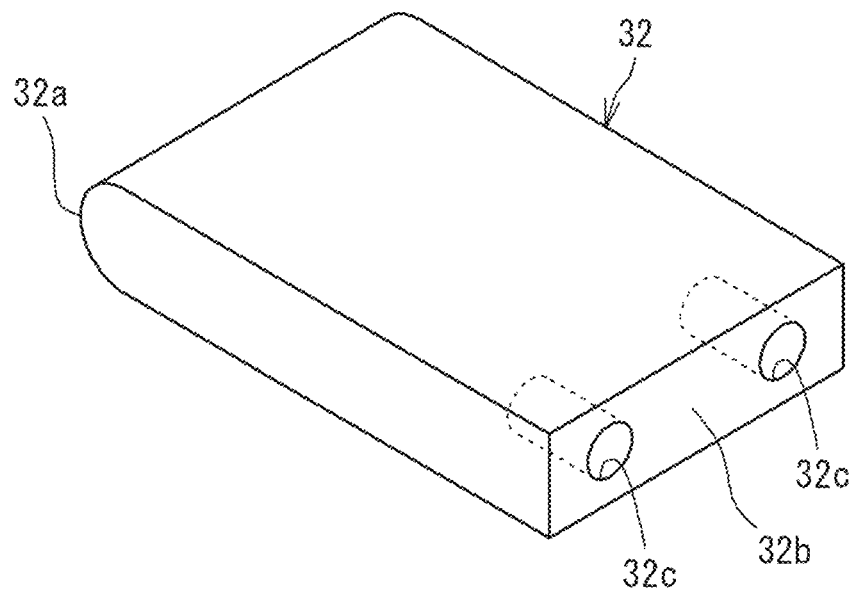
FIG. 5 is a perspective view showing a vane.

FIG. 5 is a perspective view showing the vane 32. In FIG. 3 and FIG. 5, a recess 32c is formed on a back surface 32b (surface located on the deep side of the second groove portion 31e) of the vane 32. A plurality of recesses 32c (two in FIG. 5) are formed on the vane 32 so as to be aligned in the axial direction of the rotor 31.

Each recess 32c is formed with a size that allows a portion on the tip (small diameter end) side of the exposed portion 33a to be inserted thereinto. Accordingly, the tip end sides of the exposed portions 33a, of the plurality of conical coil springs 33, which are exposed to the vane 32 side from the retaining member 42, are individually inserted into the plurality of recesses 32c.

The tip of the exposed portion 33a inserted into each recess 32c is in contact with the bottom surface of the recess 32c. Accordingly, the plurality of conical coil springs 33 in each mounting groove 31c bias the vane 32 in a direction in which the vane 32 is caused to project from the outer circumferential surface 31b of the rotor 31. The other portion of the exposed portion 33a of each conical coil spring 33 is exposed in a space S1 of the second groove portion 31e.

The space S1 is a space formed on the deep side of the vane 32 in the second groove portion 31e. The volume of the space S1 increases and decreases as the vane 32 projects and retracts with respect to the rotor 31. Specifically, the volume of the space S1 increases when the vane 32 projects from the rotor 31, and the volume of the space S1 decreases when the vane 32 retracts into the rotor 31.

[Housing]

In FIG. 1 and FIG. 2, the housing 34 of the circulation pump mechanism 30 is mounted on the inner circumferential side of the seal case 2. Specifically, the housing 34 is placed between a step surface 3b of the first case body 3 and a projection end surface 4c of the second case body 4. The housing 34 has a cam ring 35, and a first outer side plate 36 and a second outer side plate 37 placed on both sides in the axial direction of the cam ring 35. The cam ring 35, the first outer side plate 36, and the second outer side plate 37 are restricted from rotating relative to the seal case 2 by a plurality of pins 40 (three in FIG. 2) which penetrate the cam ring 35, the first outer side plate 36, and the second outer side plate 37 in the axial direction.

A plurality of springs 41 (only one in FIG. 1) are provided between the first outer side plate 36 and the second case body 4 so as to be spaced at predetermined intervals in the circumferential direction. Each spring 41 presses the first outer side plate 36 against the second case body 4 toward the machine outer side. Accordingly, the housing 34 is held between the step surface 3b of the first case body 3 and the projection end surface 4c of the second case body 4 in a state of being biased toward the machine outer side, and is movable toward the machine inner side against the biasing forces of the springs 41. Each spring 41 may be placed between the first case body 3 and the second outer side plate 37 and press the second outer side plate 37 against the first case body 3 toward the machine inner side.

The cam ring 35 is composed of, for example, an annular member made of a metal such as stainless steel. The cam ring 35 is placed between the first case body 3 and the rotor 31. The length in the axial direction of the cam ring 35 is substantially the same as the length in the axial direction of the rotor 31. An outer circumferential surface 35a of the cam ring 35 is a circumferential surface having a center at an axis C1 of the rotary shaft 51.

An inner circumferential surface 35b of the cam ring 35 is a circumferential surface having a center C2 at a position eccentric with respect to the axis C1 of the rotary shaft 51. In the present embodiment, the center C2 of the inner circumferential surface 35b of the cam ring 35 is eccentric on the upper side of FIG. 2 with respect to the axis C1 of the rotary shaft 51. Accordingly, the inner circumferential surface 35b of the cam ring 35 is eccentric with respect to the outer circumferential surface 31b of the rotor 31. Specifically, the inner circumferential surface 35b of the cam ring 35 is eccentric so as to be gradually separated from the outer circumferential surface 31b of the rotor 31 in a first angle range θ1 from 6 o'clock to 12 o'clock in FIG. 2. In addition, the inner circumferential surface 35b of the cam ring 35 is eccentric so as to be gradually closer to the outer circumferential surface 31b of the rotor 31 in a second angle range θ2 from 12 o'clock to 6 o'clock in FIG. 2.

The inner circumferential surface 35b of the cam ring 35 is a sliding surface on which a tip 32a of each vane 32 slides as the rotor 31 rotates. Each time the rotor 31 makes one rotation in the direction of an arrow E, each vane 32 alternately repeats projection movement of projecting from the mounting groove 31c and retraction movement of retracting into the mounting groove 31c while sliding on the inner circumferential surface 35b of the cam ring 35. Each vane 32 of the present embodiment moves so as to project in the first angle range θ1 and moves so as to retract in the second angle range θ2.

In the first angle range θ1, each vane 32 gradually moves so as to project by the biasing forces of the springs 33 from a state of retracting most into the mounting groove 31c (6 o'clock state) to a state of projecting most from the mounting groove 31c (12 o'clock state). In the second angle range θ2, each vane 32 gradually moves so as to retract against the biasing forces of the springs 33 by being pressed against the inner circumferential surface 35b of the cam ring 35 from the state of projecting most (12 o'clock state) to the state of retracting most (6 o'clock state).

The first outer side plate 36 and the second outer side plate 37 are each composed of, for example, a disc member made of carbon, and are placed between the first case body 3 and the sleeve 9. Both side surfaces in the axial direction of the rotor 31 slide on the side surface on the machine outer side of the first outer side plate 36 and the side surface on the machine inner side of the second outer side plate 37, respectively.

Due to the above configuration, the plurality of pump chambers 38 (four in FIG. 2) are formed between the outer circumferential surface 31b of the rotor 31 and the inner circumferential surface 35b of the cam ring 35 in the interior of the housing 34 so as to be demarcated by the vanes 32, 32 adjacent to each other in the circumferential direction. Each pump chamber 38 is a space into and from which the sealing liquid is sucked and discharged.

The volume of each pump chamber 38 changes as the rotor 31 rotates. In the present embodiment, each time the rotor 31 makes one rotation in the direction of the arrow E, the volume of the pump chamber 38 changes so as to gradually increase in the first angle range θ1, and the volume of the pump chamber 38 changes so as to gradually decrease in the second angle range θ2.

Figure 6:
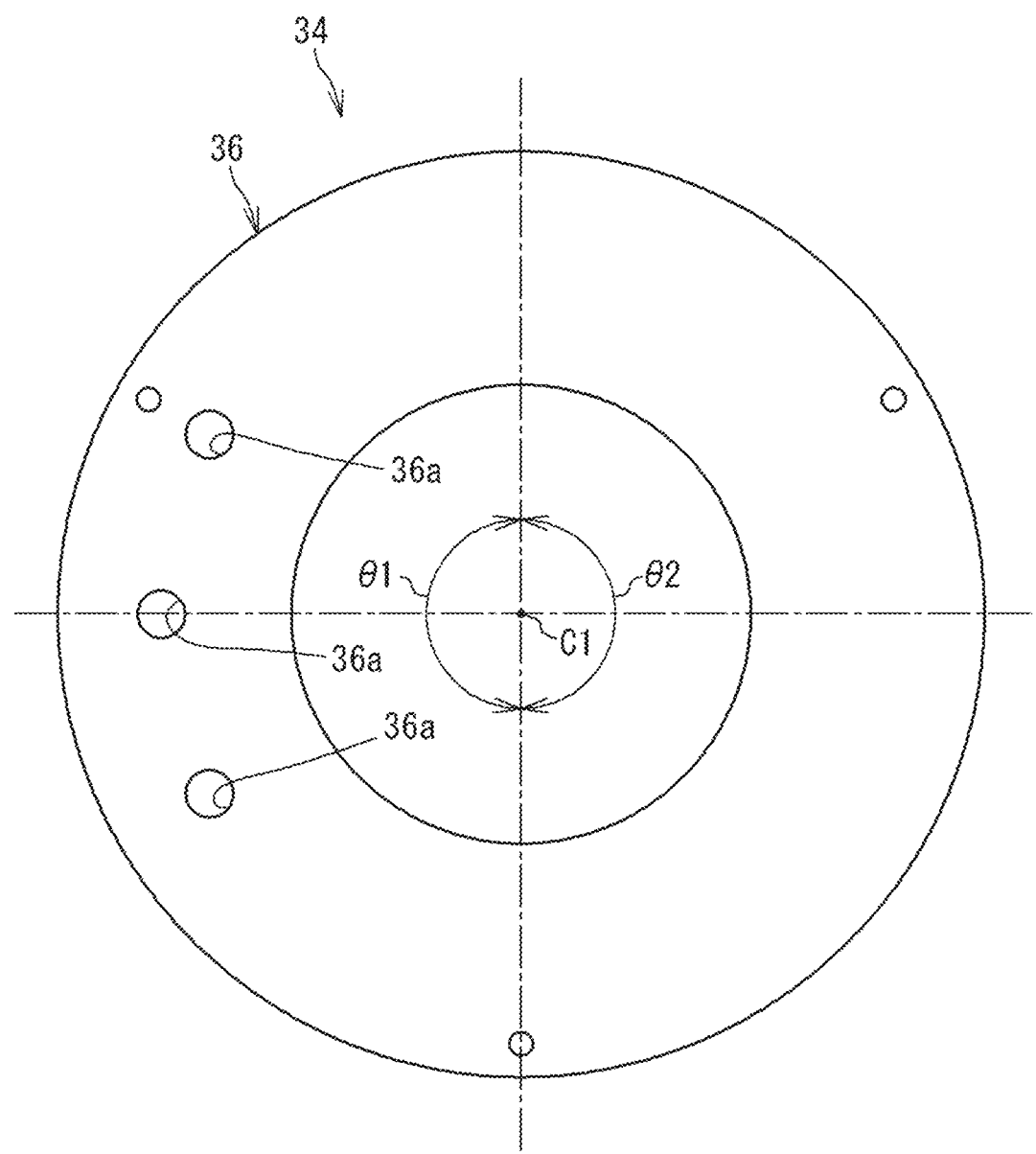
FIG. 6 is a side view of a first outer side plate of a housing as seen from a machine outer side.

FIG. 6 is a side view of the first outer side plate 36 of the housing 34 as seen from the machine outer side. As shown in FIG. 1 and FIG. 6, a plurality of suction ports 36a (three in FIG. 6) are formed in the first angle range θ1 of the first outer side plate 36 so as to be spaced at predetermined intervals in the circumferential direction. Accordingly, when each pump chamber 38 passes through the first angle range θ1 due to the rotation of the rotor 31, the volume of the pump chamber 38 gradually increases, thereby causing the pressure in the pump chamber 38 to change from a positive pressure to a negative pressure. When the pressure in the pump chamber 38 becomes negative as described above, an action of sucking the sealing liquid through each suction port 36a into the pump chamber 38 is generated. Accordingly, the sealing liquid in the sealing liquid chamber 8 is sucked through each suction port 36a into the pump chamber 38.

Figure 7:
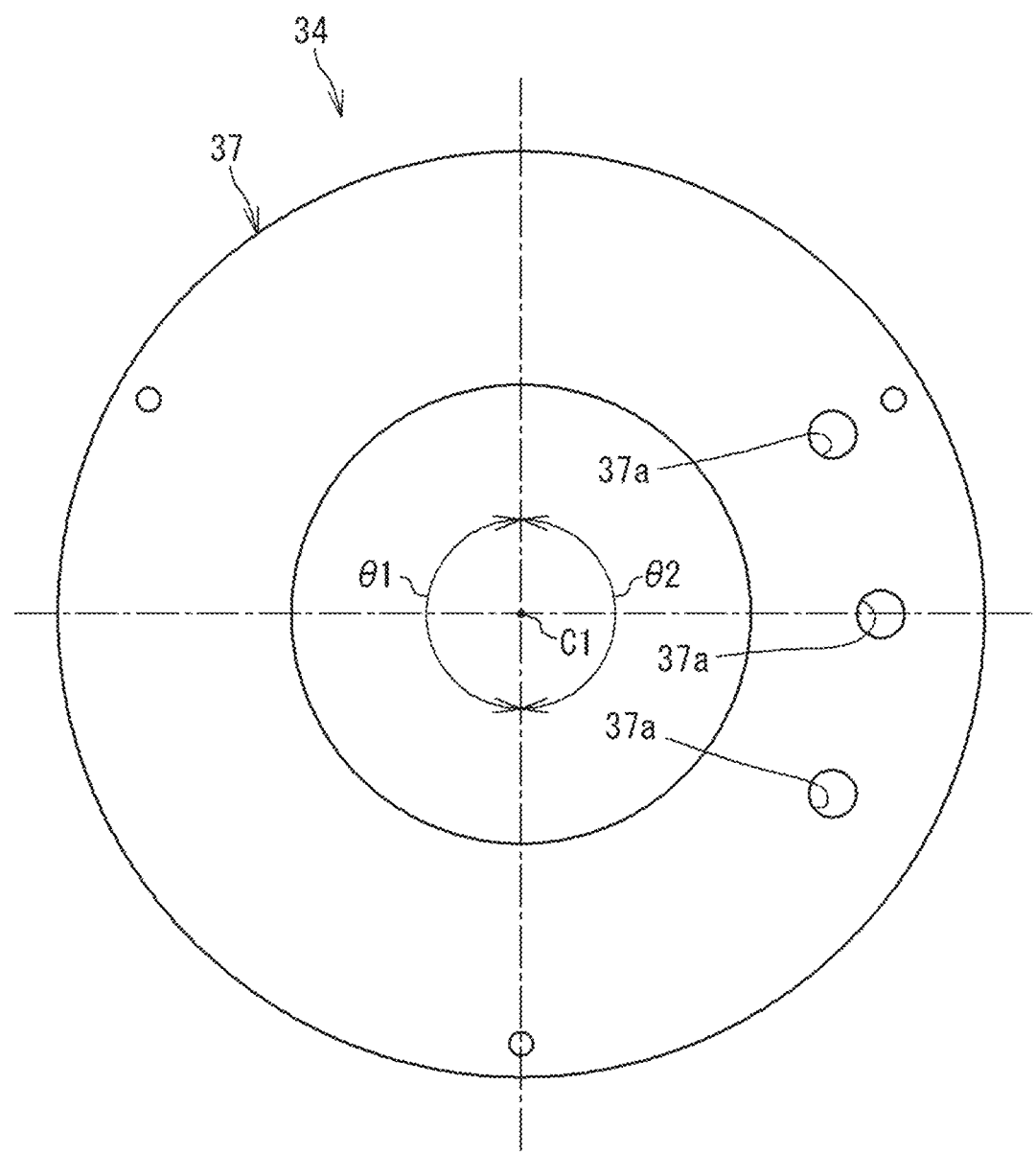
FIG. 7 is a side view of a second outer side plate of the housing as seen from the machine outer side.

FIG. 7 is a side view of the second outer side plate 37 of the housing 34 as seen from the machine outer side. As shown in FIG. 1 and FIG. 7, a plurality of discharge ports 37a (three in FIG. 7) are formed in the second angle range θ2 of the second outer side plate 37 so as to be spaced at predetermined intervals in the circumferential direction. Accordingly, when each pump chamber 38 passes through the second angle range θ2 due to the rotation of the rotor 31, the volume of the pump chamber 38 gradually decreases, thereby causing the pressure in the pump chamber 38 to change from a negative pressure to a positive pressure. When the pressure in the pump chamber 38 becomes positive as described above, an action of discharging the sealing liquid through each discharge port 37a to the outside of the pump chamber 38 is generated. Accordingly, the sealing liquid in the pump chamber 38 is discharged through each discharge port 37a to the sealing liquid chamber 8.

Due to the above configuration, the circulation pump mechanism 30 functions as a vane pump, and can circulate a fixed volume of the sealing liquid each time the rotor 31 makes one rotation. In FIG. 1, for ease of understanding, the positions of the suction port 36a and the discharge port 37a are shown so as to be shifted in the circumferential direction.

[Cut Grooves]

In FIG. 2 and FIG. 3, a plurality of cut grooves 31f are formed on the outer circumferential surface 31b of the rotor 31 so as to be spaced in the circumferential direction. The number of cut grooves 31f is the same as the number of vanes 32 (four). Each cut groove 31f is formed on the outer circumferential surface 31b of the rotor 31 at a position, on the leading side in the rotation direction of the rotor 31, slightly further away from the tip 32a of the vane 32. Each cut groove 31f is formed in a V-shape in an axial view.

Each cut groove 31f has a first side surface 31g and a second side surface 31h. The first side surface 31g is formed on the trailing side in the rotation direction of the rotor 31. The second side surface 31h is formed in the leading side in the rotation direction of the rotor 31. An angle α formed between the first side surface 31g and the second side surface 31h is set to have a magnitude that allows a machining tool (such as a drill) to easily access the first side surface 31g when a communication flow path 45 described later is machined in the rotor 31 with the machining tool.

[Communication Flow Paths]

The circulation pump mechanism 30 further includes a plurality of communication flow paths 45 formed in the rotor 31. The number of communication flow paths 45 is the same as the number of vanes 32 (four). Each communication flow path 45 is a flow path that provides communication between the space S1 of the mounting groove 31c and the pump chamber 38. Each communication flow path 45 of the present embodiment is formed in the rotor 31 independently of the mounting groove 31c.

Figure 8:
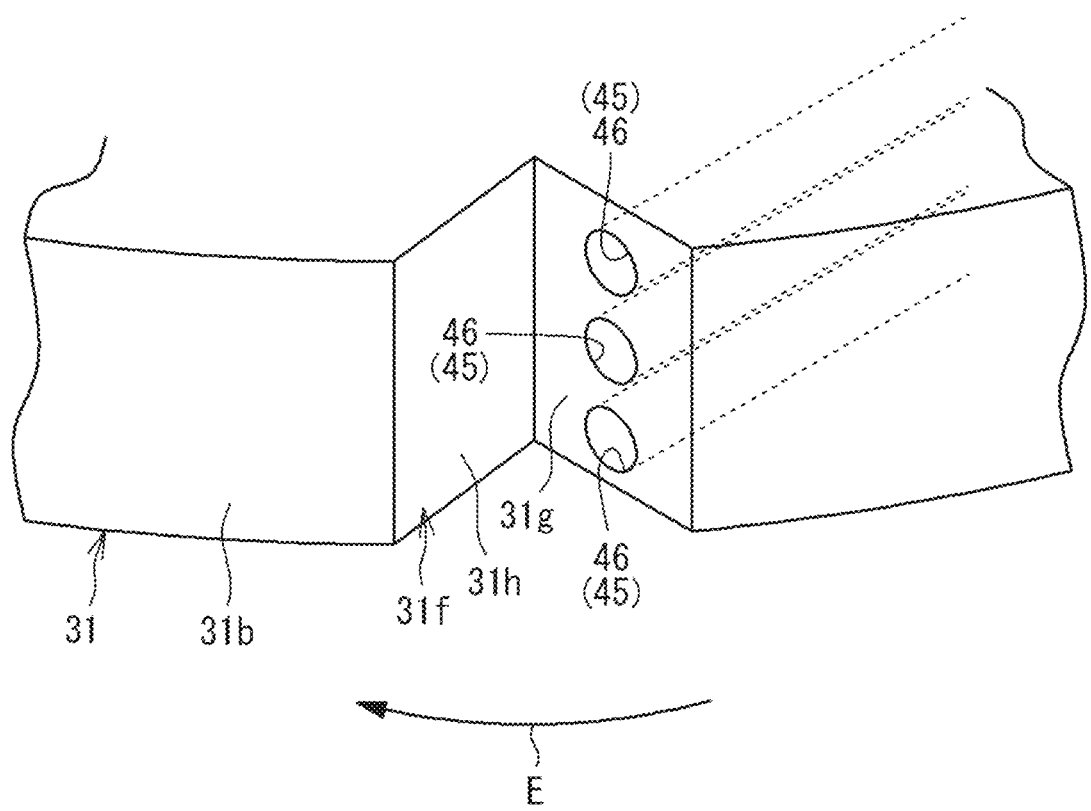
FIG. 8 is an enlarged perspective view showing an area around a cut groove of a rotor.

FIG. 8 is an enlarged perspective view showing an area around the cut groove 31f of the rotor 31. In FIG. 3 and FIG. 8, each communication flow path 45 has a plurality of flow path portions 46 aligned so as to be spaced in the axial direction of the rotor 31 (up-down direction in FIG. 8). Each flow path portion 46 is composed of, for example, a hole having a circular cross-section. One end in the longitudinal direction of each flow path portion 46 is open at the first side surface (side surface) 31g of the cut groove 31f. The other end in the longitudinal direction of each flow path portion 46 is open at the side surface 31e1 of the second groove portion 31e of the mounting groove 31c. Due to the above, each flow path portion 46 of each communication flow path 45 provides communication between the space S1 of the mounting groove 31c and the pump chamber 38 demarcated on the leading side in the rotation direction of the rotor 31 with respect to the tip 32a of the vane 32 inserted into the mounting groove 31c.

In FIG. 2 and FIG. 3, when the rotor 31 rotates in the first angle range θ1, the plurality of flow path portions 46 function as supply flow paths for supplying the sealing liquid from the pump chamber 38 into the space S1 of the mounting groove 31c. Specifically, in the first angle range θ1, the sealing liquid is sucked through each suction port 36a of the first outer side plate 36 into the pump chamber 38. Accordingly, the sealing liquid in the pump chamber 38 flows from the cut groove 31f, which is formed on the outer circumferential surface 31b of the rotor 31 facing the pump chamber 38, into the plurality of flow path portions 46 which are open at the first side surface 31g of the cut groove 31f. The sealing liquid having flowed into the plurality of flow path portions 46 flows into the space S1 of the mounting groove 31c communicating with these flow path portions 46. Therefore, when the rotor 31 rotates in the first angle range θ1, the pressure of the sealing liquid having flowed into the space S1 acts as a back pressure on the back surface 32b of the vane 32.

When the rotor 31 rotates in the second angle range θ2, the plurality of flow path portions 46 function as discharge flow paths for discharging the sealing liquid in the space S1 to the pump chamber 38. Specifically, in the second angle range θ2, the vane 32 moves so as to retract into the mounting groove 31c against the biasing forces of the conical coil springs 33 as described above. Accordingly, the sealing liquid in the space S1 passes through the plurality of flow path portions 46 and is discharged from the cut groove 31f to the pump chamber 38. At that time, dust in the space S1 is discharged together with the sealing liquid to the pump chamber 38 via the plurality of flow path portions 46, so that the plurality of flow path portions 46 also function as flow paths for cleaning the space S1.

Advantageous Effects

As described above, in the mechanical seal device 1 of the present embodiment, the spring 33 is inserted into each insertion hole 42a of the retaining member 42 provided on the deep side with respect to the vane 32 in each mounting groove 31c of the rotor 31 of the circulation pump mechanism 30. Therefore, the intermediate portion in the longitudinal direction of the spring 33 is held by the retaining member 42. Accordingly, the intermediate portion of the spring 33 can be inhibited from buckling and coming into contact with the side surfaces 31d1 and 31e1 of the mounting groove 31c. As a result, the spring 33 can be inhibited from coming into contact with the rotor 31 and wearing.

Each spring 33 is a conical coil spring, and the small diameter end side of the conical coil spring 33 is the exposed portion 33a which is exposed to the vane 32 side from the retaining member 42. Accordingly, the exposed portion 33a of the conical coil spring 33 has a smaller diameter than the other portion of the conical coil spring 33. Therefore, the exposed portion 33a of the conical coil spring 33 can be further inhibited from coming into contact with the side surfaces 31d1 and 31e1 of the mounting groove 31c. As a result, the spring (conical coil spring) 33 can be further inhibited from coming into contact with the rotor 31 and wearing. The plurality of springs 33 are individually inserted into the plurality of insertion holes 42a formed in each retaining member 42. Therefore, the springs 33 can be inhibited from coming into contact with each other and wearing.

The exposed portion 33a of each spring 33 is inserted into the recess 32c formed on the back surface 32b of the vane 32. Therefore, the exposed portion 33a of each spring 33 can be further inhibited from coming into contact with the side surfaces 31d1 and 31e1 of the mounting groove 31c. As a result, the spring 33 can be further inhibited from coming into contact with the rotor 31 and wearing.

The plurality of springs 33 are individually inserted into the plurality of recesses 32c formed on the back surface 32b of the vane 32. Therefore, the exposed portions 33a of the springs 33 can be inhibited from coming into contact with each other and wearing.

Second Embodiment

Figure 9:
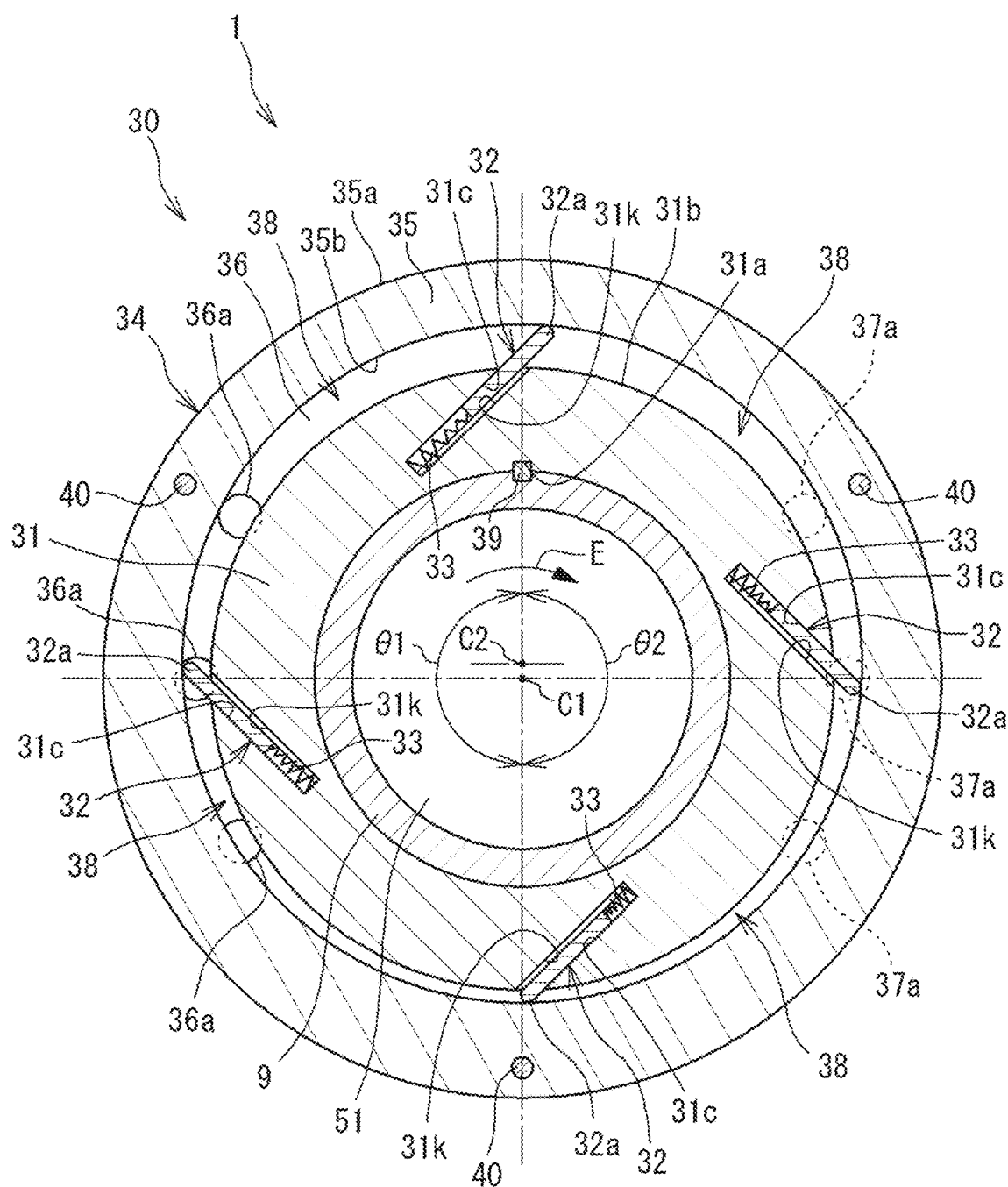
FIG. 9 is a cross-sectional view showing a circulation pump mechanism of a mechanical seal device according to a second embodiment of the present disclosure.
Figure 10:
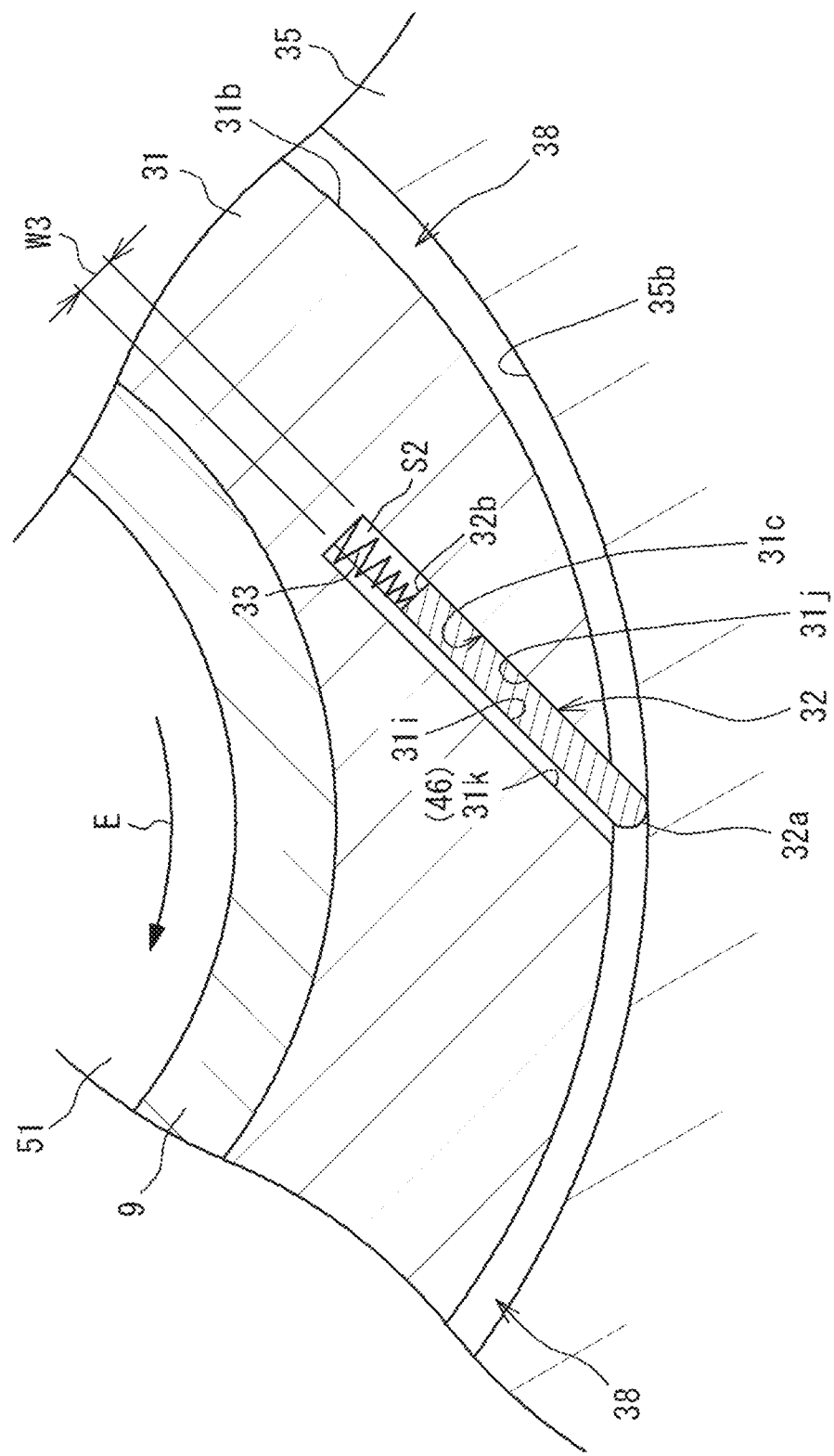
FIG. 10 is an enlarged cross-sectional view showing an area around 6 o'clock in FIG. 9 in the circulation pump mechanism of the second embodiment.

FIG. 9 is a cross-sectional view showing a circulation pump mechanism 30 of a mechanical seal device 1 according to a second embodiment of the present disclosure. FIG. 10 is an enlarged cross-sectional view showing an area around 6 o'clock in FIG. 9 in the circulation pump mechanism 30. The circulation pump mechanism 30 of the present embodiment is different from the first embodiment in that the retaining members 42 (see FIG. 2) into which the springs 33 are inserted are not included, and each of the configurations of the mounting grooves 31c of the rotor 31 and the communication flow paths 45 is different.

Figure 11:
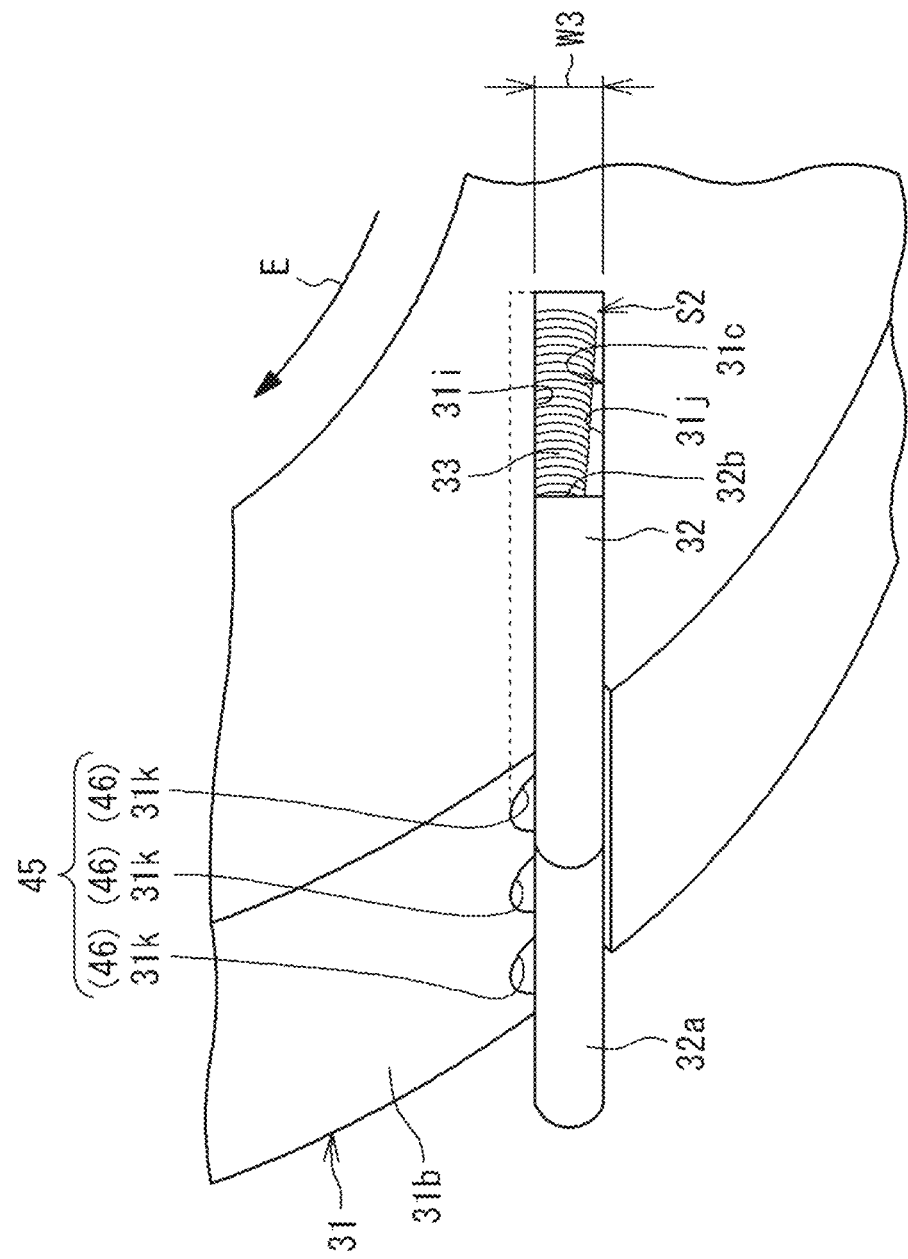
FIG. 11 is an enlarged perspective view showing an area around a mounting groove of a rotor of the second embodiment.

In FIG. 9 and FIG. 10, each mounting groove 31c of the rotor 31 in the circulation pump mechanism 30 of the present embodiment has a constant groove width W3 over the entirety in the depth direction thereof (see also FIG. 11). Each mounting groove 31c has a first side surface 31i and a second side surface 31j facing each other. The first side surface 31i is formed on the leading side in the rotation direction of the rotor 31. The second side surface 31j is formed on the trailing side in the rotation direction of the rotor 31.

FIG. 11 is an enlarged perspective view showing an area around the mounting groove 31c of the rotor 31. In FIG. 10 and FIG. 11, a plurality of small grooves 31k (three in FIG. 11) are formed on the first side surface 31i of each mounting groove 31c so as to be aligned in the axial direction of the rotor 31. Each small groove 31k is formed to have an arc-shaped cross-section. Each small groove 31k is formed over the entirety in the depth direction of the mounting groove 31c. Each small groove 31k is formed with a size that allows a portion in the circumferential direction at the large diameter end of the conical coil spring 33 to be inserted thereinto.

The conical coil spring 33 is inserted into each mounting groove 31c such that a portion in the circumferential direction of the conical coil spring 33 is placed in each of the plurality of small grooves 31k. The vane 32 is inserted at the front of the conical coil spring 33 in each mounting groove 31c. The vane 32 is slidable relative to the first side surface 31i and the second side surface 31j of the mounting groove 31c. The small diameter end of the conical coil spring 33 is in contact with the back surface 32b of the vane 32.

Due to the above configuration, a plurality of conical coil springs 33 (three in this case) are provided in a space S2 on the deep side with respect to the vane 32 in each mounting groove 31c so as to be aligned in the axial direction. These conical coil springs 33 bias the vane 32 in a direction in which the vane 32 is caused to project from the outer circumferential surface 31b of the rotor 31. Each conical coil spring 33 of the present embodiment is inserted into the mounting groove 31c such that the large diameter end thereof is placed on the deep side, but may be inserted into the mounting groove 31c such that the small diameter end thereof is placed on the deep side.

In FIG. 9 and FIG. 10, the plurality of small grooves 31k formed in each mounting groove 31c communicate with the space S2 on the deep side of the mounting groove 31c. In addition, the plurality of small grooves 31k are open at the outer circumferential surface 31b of the rotor 31. Accordingly, the plurality of small grooves 31k provide communication between the space S2 of each mounting groove 31c and the pump chamber 38 demarcated on the leading side in the rotation direction of the rotor 31 with respect to the mounting groove 31c. Therefore, in the present embodiment, the plurality of small grooves 31k formed in each mounting groove 31c function as the plurality of flow path portions 46 of the communication flow path 45.

Each small groove 31k has both a function of placing a portion in the circumferential direction of the conical coil spring 33 therein and a function as the flow path portion 46, but may function only as the flow path portion 46. In this case, each conical coil spring 33 may be sized to be inserted within the groove width W3 of the mounting groove 31c. The other components of the present embodiment are the same as in the first embodiment, and thus are designated by the same reference signs, and the description thereof is omitted.

As described above, in the mechanical seal device 1 of the present embodiment, a conical coil spring is provided, as each spring 33 which biases the vane 32, on the deep side with respect to the vane 32 in each mounting groove 31c of the rotor 31 of the circulation pump mechanism 30. Accordingly, by setting the outer diameter at the large diameter end of the conical coil spring 33 to be equal to or smaller than the outer diameter of a cylindrical spring in the conventional art, the intermediate portion in the longitudinal direction of the conical coil spring 33 can be inhibited from coming into contact with the side surfaces 31d1 and 31e1 of the mounting groove 31c. As a result, the spring (conical coil spring) 33 can be inhibited from coming into contact with the rotor 31 and wearing.

<Others>

The mechanical seal device 1 of the present disclosure includes a double-type mechanical seal, but it is sufficient that the mechanical seal device 1 includes at least one mechanical seal such as a single-type mechanical seal. The circulation pump mechanism 30 does not need to include the communication flow paths 45 if the biasing forces of the springs 33 are greater than the pressure of the sealing liquid in the pump chamber 38.

The number of springs 33 provided in each mounting groove 31c, the number of insertion holes 42a formed in each retaining member 42, and the number of recesses 32c formed in each vane 32 are not limited to those of the above embodiments. Each spring 33 of the first embodiment is not limited to a conical coil spring, and may be, for example, a cylindrical spring.

The embodiments disclosed herein are merely illustrative and not restrictive in all aspects. The scope of the present invention is defined by the scope of the claims rather than the meaning described above, and is intended to include meaning equivalent to the scope of the claims and all modifications within the scope.

REFERENCE SIGNS LIST 1 mechanical seal device
2 seal case
6 first mechanical seal (mechanical seal)
7 second mechanical seal (mechanical seal)
8 sealing liquid chamber
30 circulation pump mechanism
31 rotor
31b outer circumferential surface
31c mounting groove
32 vane
32c recess
33 spring (conical coil spring)
33a exposed portion
42 retaining member
42a insertion hole
50 rotary machine
51 rotary shaft
A machine inner area
B machine outer area

The invention claimed is:

1. A mechanical seal device comprising:
a seal case surrounding a rotary shaft of a rotary machine and separating a machine inner area and a machine outer area of the rotary machine from each other;
at least one mechanical seal placed between the seal case and the rotary shaft;
a sealing liquid chamber which is formed in the seal case and into which a sealing liquid for lubricating a sliding portion of the mechanical seal is introduced; and
a circulation pump mechanism configured to circulate the sealing liquid in the sealing liquid chamber, wherein
the circulation pump mechanism includes
an annular rotor provided on a rotary shaft side so as to be integrally rotatable with the rotary shaft and having a mounting groove open at an outer circumferential surface thereof,
a vane provided in the mounting groove and configured to freely project and retract with respect to the outer circumferential surface of the rotor,
a spring provided on a deep side with respect to the vane in the mounting groove and configured to bias the vane in a direction in which the vane is caused to project from the outer circumferential surface of the rotor, and
a retaining member provided on the deep side with respect to the vane in the mounting groove and having an insertion hole into which the spring is inserted.

2. The mechanical seal device according to claim 1, wherein the spring is a conical coil spring, and a small diameter end side of the conical coil spring is exposed to the vane side from the retaining member.

3. The mechanical seal device according to claim 1, wherein the circulation pump mechanism includes a plurality of the springs provided in the mounting groove, and a plurality of the insertion holes into which the plurality of the springs are individually inserted are formed in the retaining member.

4. The mechanical seal device according to claim 1, wherein the spring has an exposed portion exposed to the vane side from the retaining member, and a recess into which the exposed portion is inserted is formed on the vane.

5. The mechanical seal device according to claim 4, wherein the circulation pump mechanism includes a plurality of the springs placed in the mounting groove, and a plurality of the recesses into which the exposed portions of the plurality of the springs are individually inserted are formed on the vane.

6. A mechanical seal device comprising:

a seal case surrounding a rotary shaft of a rotary machine and separating a machine inner area and a machine outer area of the rotary machine from each other;

at least one mechanical seal placed between the seal case and the rotary shaft;

a sealing liquid chamber which is formed in the seal case and into which a sealing liquid for lubricating a sliding portion of the mechanical seal is introduced; and a circulation pump mechanism configured to circulate the sealing liquid in the sealing liquid chamber, wherein the circulation pump mechanism includes an annular rotor provided on a rotary shaft side so as to be integrally rotatable with the rotary shaft and having a mounting groove open at an outer circumferential surface thereof, a vane provided in the mounting groove and configured to freely project and retract with respect to the outer circumferential surface of the rotor, and a spring provided on a deep side with respect to the vane in the mounting groove and configured to bias the vane in a direction in which the vane is caused to project from the outer circumferential surface of the rotor, and the spring is a conical coil spring.

\* \* \* \* \*